United States Patent [19]

Pavlick

[11] Patent Number: 4,648,764
[45] Date of Patent: Mar. 10, 1987

[54] PORTABLE STACKING CONTAINERS LOCKING DEVICE

[75] Inventor: Michael J. Pavlick, Norristown, Pa.

[73] Assignee: The Budd Company, Troy, Mich.

[21] Appl. No.: 385,697

[22] Filed: Jun. 7, 1982

[51] Int. Cl.$^4$ ............................. B60P 7/13; B61D 3/20
[52] U.S. Cl. ........................................ 410/77; 24/287;
 105/406.1; 206/512; 206/821; 410/82; 410/94;
 410/121
[58] Field of Search ................... 105/4 R, 406 R, 416,
 105/418, 453; 206/511, 512, 821; 213/75 R;
 248/220.1; 410/54, 56, 65, 68, 77, 78, 81, 82, 94,
 95, 121, 140, 141; 24/287

[56] References Cited

U.S. PATENT DOCUMENTS

| | | | |
|---|---|---|---|
| 1,038,923 | 9/1912 | Mathy | 206/511 |
| 1,922,632 | 8/1933 | Owens | 410/94 |
| 1,949,218 | 2/1934 | Owens | 410/94 |
| 2,114,707 | 4/1938 | Fitch et al. | 410/94 |
| 2,305,444 | 12/1942 | Pond | 105/453 X |
| 2,579,685 | 12/1951 | Loose | 410/78 X |
| 3,081,716 | 3/1963 | Szczepanik | 105/416 |
| 3,101,679 | 8/1963 | Principe et al. | 410/56 |
| 3,357,371 | 12/1967 | Gutridge | 410/54 |
| 3,389,663 | 6/1968 | Gutridge | 206/512 X |
| 3,505,962 | 4/1970 | Cisco | 410/77 X |
| 3,610,168 | 10/1971 | Macomber | 410/65 |
| 3,716,146 | 2/1973 | Altherr | 213/75 R |
| 3,805,709 | 4/1974 | Schuller et al. | 410/54 |
| 4,091,742 | 5/1978 | Cordani | 105/406 R X |
| 4,139,228 | 2/1979 | Varadi | 410/82 X |
| 4,354,781 | 10/1982 | Roberts | 410/77 |

FOREIGN PATENT DOCUMENTS 2734750 2/1979 Fed. Rep. of Germany ...... 206/512

Primary Examiner—Randolph A. Reese
Attorney, Agent, or Firm—Edward M. Farrell; Herman Foster; Thomas I. Davenport

[57] ABSTRACT

A system for stacking two similar sized containers on a low level, flat car or trailer of a predetermined size is provided. The containers include fittings at all their corners to receive locking devices. Angular members include locking devices and are dimensioned to overlap two adjacent fittings only of the stacked containers with the twist locking devices locking the angular members to the corner fittings of the top or bottom container to restrict movements between the containers.

8 Claims, 14 Drawing Figures

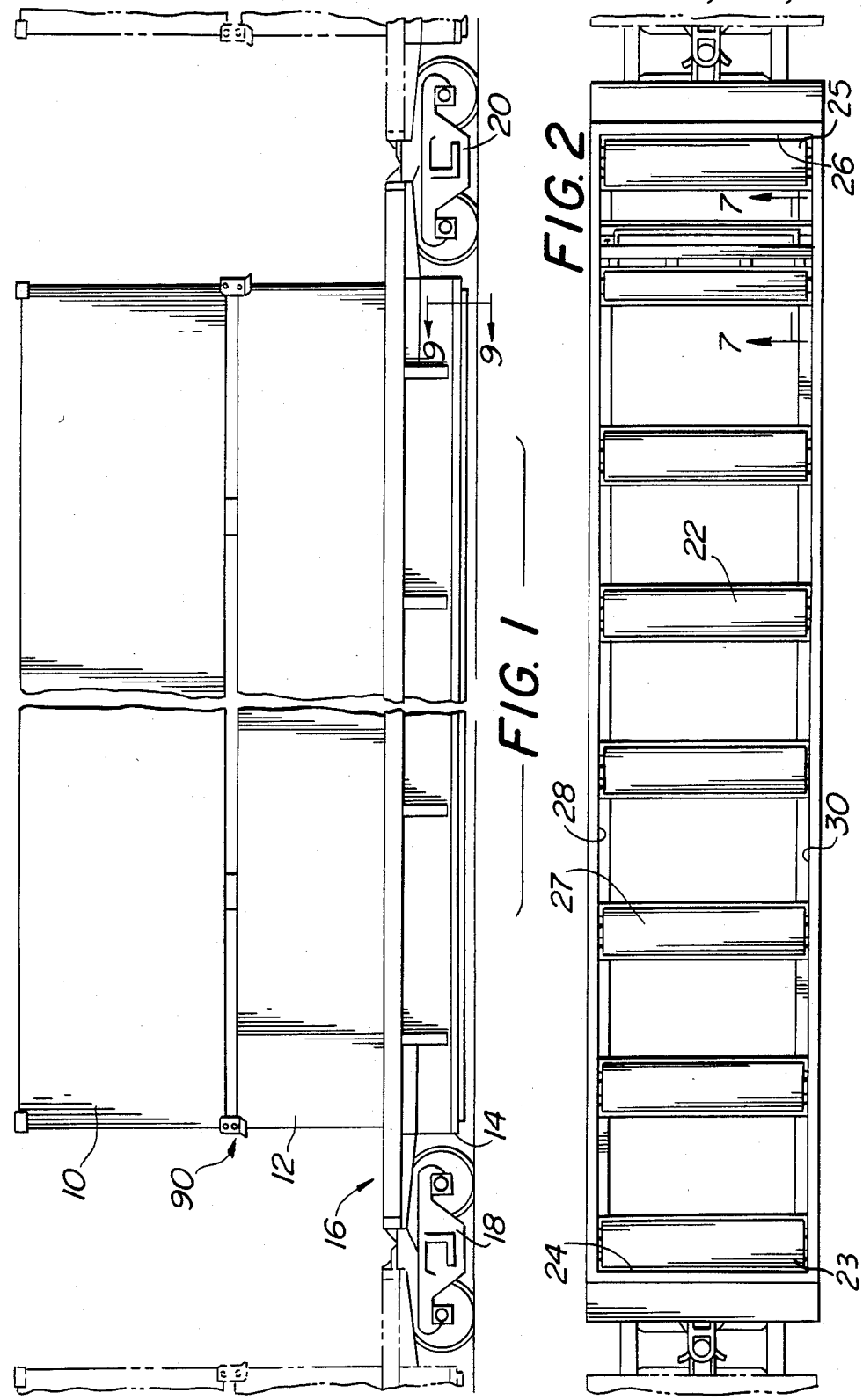

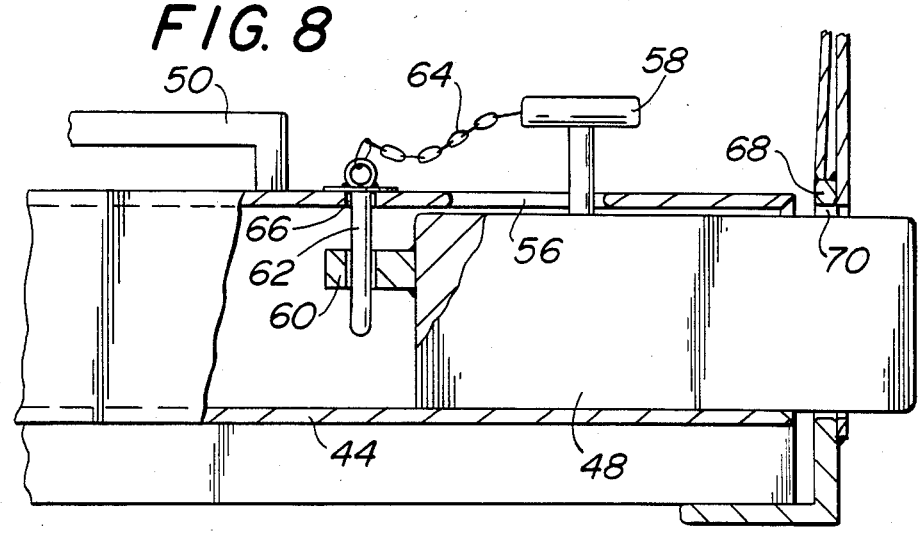
FIG. 8
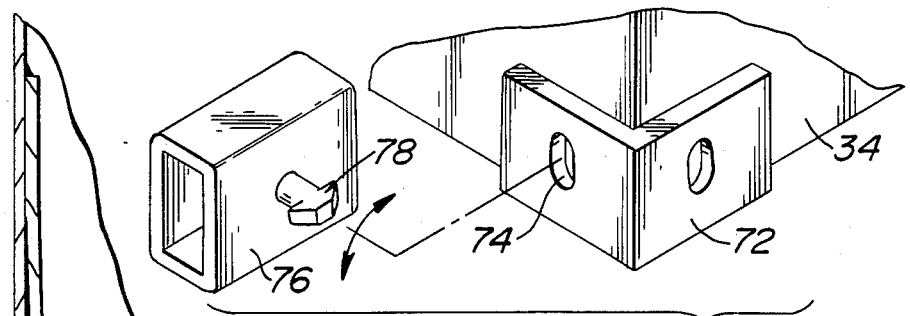
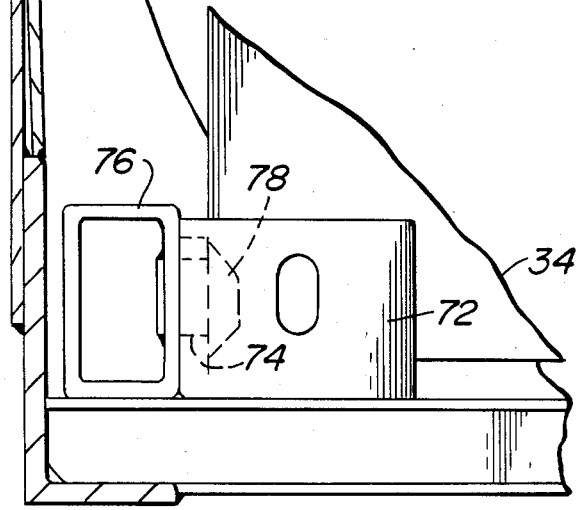
FIG. 10
FIG. 9

PORTABLE STACKING CONTAINERS LOCKING DEVICE

BACKGROUND OF THE INVENTION

Relatively large containers used heretofore desired to be transported from one location to another have been rectangularly shaped boxes which have included corner fittings at all of the top and bottom corners. These fittings are adapted to receive twist locking devices therein to permit the containers to be locked in place to a carrier while being transported or lifted from the carrier.

Flat cars have been used to carry containers. Stacking one container upon another in a well of a railway car has also been done.

Carrier cars for carrying stacked containers used heretofore have utilized super structures on the cars which comprise large heave bulkheads at the ends of the car to take the loads of the upper containers.

Carrier cars used heretofore for carrying stacked containers have been generally designed to accommodate containers of a predetermined size, such as, for example, containers which are 40 feet long and 8 feet wide.

While containers used heretofore have often been 40 feet by 8 feet, recent containers have been used which are 45 feet long. Because it is desired to make the containers as long as possible, containers 8-½ feet wide are being considered.

The size of the flat carriers carrying the containers must relate to the sizes of the containers to be carried. When containers of different lengths and widths are considered, it becomes impractical to efficiently build a differently designed car for each size container to be carried.

OBJECTS OF THE INVENTION

It is an object of this invention to provide an improved flat car system for carrying a large number of containers to permit overall reduction in the train length.

It is a further object of this invention to provide an improved arrangement in a flat car system which permits the carrying of a variety of different sized containers.

It is a further object of this invention to provide improved attachment members for transferring loads from an upper container to a lower container on which it is stacked.

It is still a further object of this invention to provide an improved system for stacking containers on a flat car without the necessity of large heavy bulkheads at the end of the car to take the load off the upper container thereby providing a lighter car than those used heretofore.

BRIEF SUMMARY OF THE INVENTION

In accordance with the present invention, a system for stacking two similar sized containers on a low level, flat car or trailer of a predetermined size is provided. The containers include fittings at all their corners adapted to recieve locking devices. Angular members include locking devices and are dimensioned to overlap two adjacent fittings of the stacked containers. The twist locking devices lock the angular members to the corner fittings of the top or bottom container to restrict movements between the containers. Different sized containers may be stacked with mechanical elements being provided in the flat car or trailer to limit the movements of any smaller sized containers.

Other objects and advantages of the present invention will be apparent and suggest themselves to those skilled in the art, from a reading of the following specification and claims, taken in conjunction with the accompanying drawings.

DESCRIPTION OF THE DRAWINGS

FIG. 1 is a side view of a pair of stacked containers on a low level flat car, in accordance with the present invention;

FIG. 2 is a top view of the low level railway car illustrated in FIG. 1;

FIG. 8 is a cross-sectional view taken along lines 8—8 of FIG. 7;

FIG. 9 is a cross-sectional view taken along lines 9—9 of FIG. 1 illustrating a spacer mechanism attached to the corner fitting of a container within the low level railway car illustrated in FIGS. 1 and 2;

FIG. 10 is an isometric view of the spacer mechanism illustrated in FIG. 9 prior to attachment to a corner fitting of a container, in accordance with the present invention;

DETAILED DESCRIPTION OF THE INVENTION

Figure 3:
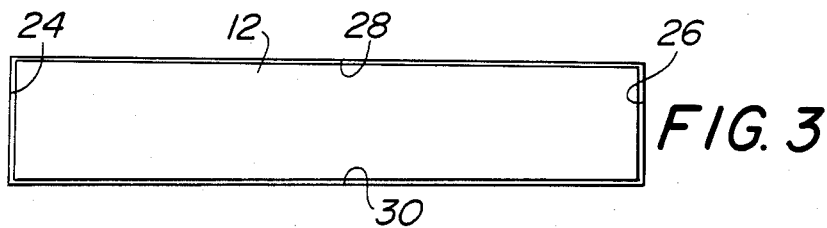
FIGS. 3, 4, 5 and 6 are views illustrating different sized containers in a well of a low level railway car.

Referring to FIGS. 1 and 2, a pair of stacked containers 10 and 12 are disposed within a well 14 of a low level flat car 16. The low level flat car 16 may be of the type generally described in a copending patent application, assigned to the same assignee as the present continuation application, entitled "Low Level Car for Carrying Trailers" Ser. No. 434,294 filed Oct. 14, 1982. As in the aforementioned application, a pair of trucks 18 and 20 are used to intercollect adjacent cars.

In the present invention, the well 14 comprises cross members 27. The end cross members 23 and 25 are stronger than the members 27 and used to receive the bottom container 12 thereon. The well further includes front wall 24 and rear wall 26 interconnected by a pair of side walls 28 and 30. In the embodiment illustrated, the well 14, which may be 8 feet, six and one-half inches wide, is designed and dimensioned to accommodate a container which is 45 feet long and 8-½ feet wide. As will be subsequently described, the floor area of the low level flat car 16 is adapted to receive means to permit containers of different sizes to be accommodated. The various sizes of the containers which may be accommodated are illustrated in FIGS. 3, 4, 5 and 6.

Referring to FIG. 3, the well area between the walls 24, 26, 28 and 30 substantially correspond to the size of the container 12, which in the embodiment illustrated is 45 feet long and 8-½ feet wide. In this case, the container 12 would be completely restrained by the car body structure itself, that is the walls 24, 26, 28 and 30. The front and rear walls 24 and 26 would restrict the longitudinal motion of the container and the side walls 28 and 30 would restrict the lateral motion of the container.

Figure 4:
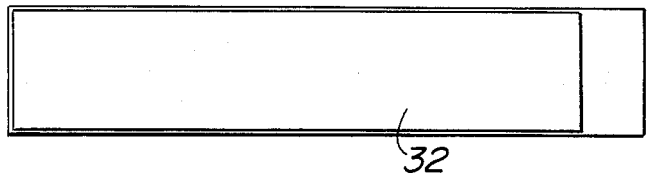
Figure 5:
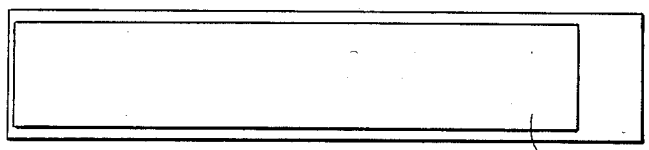
Figure 6:
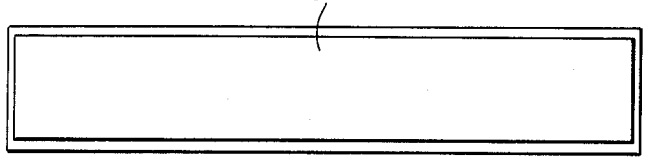

FIG. 4 illustrates a container 32 which is only 40 feet long and 8-½ feet wide. FIG. 5 illustrates a container 34 which is 40 feet long and 8 feet wide. FIG. 6 illustrates a container 36 which is 45 feet long and 8 feet wide. As will be described, the present invention is directed toward mechanical members for accommodating all of the different sized containers 30, 32, 34 and 36 in a standard car involving a well of fixed dimensions.

Figure 7:
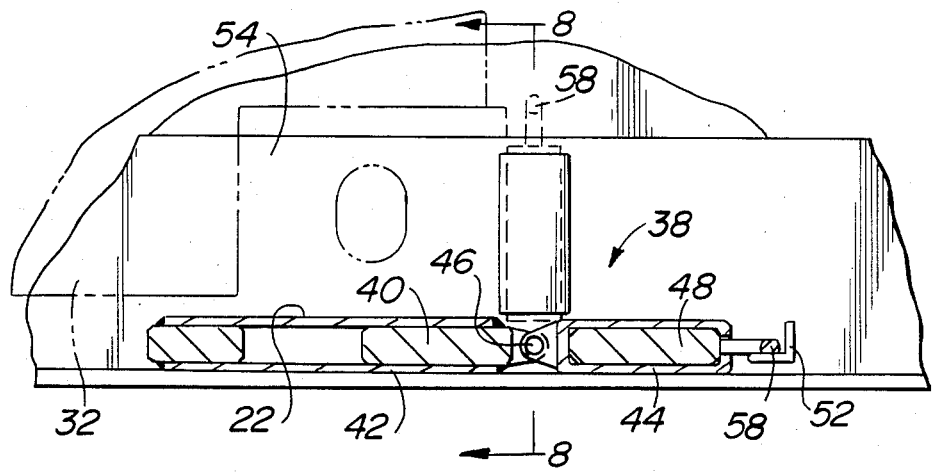
FIG. 7 is a cross-sectional view of a movable bulkhead in the railway car taken along lines 7—7 of FIG. 2.

First consider a situation as illustrated in FIG. 4 which involves a 40 foot container which is 8-½ feet wide. FIGS. 7 and 8 illustrates the mechanism for providing structure for limting the movement of the container 32 within the well of the car.

A fold down device 38 which provides a bulkhead when needed, extends the width of the well 14. The fold down device 38 comprises a metal piece 40 adapted to be inserted below the floor 22 of the well of the car. The metal piece 40 is disposed between the upper floor piece 22 and the lower piece 42. A ain bulkhead 44 is hinged to the piece 40 through a hinge mechanism 46. The bulkhead 44 includes a slideable bar 48 therein. The bulkhead 48 would normally be in a lowered position as illustrated in FIG. 4 when the carrier is carrying a 45 foot long container.

The bulkhead 44 may be at the same level as the floor 22 when it is in a lowered position. A handle 50 is connected to manually move the bulkhead 44 between upper and lower positions. The container 32 includes a corner fitting 54. The bulkhead 44, illustrated partly in dashed lines, is illustrated in an up position, FIG. 7. In this position, the bulkhead 44 engages the rear wall of the container 32 to restrict the movement thereof between the front wall 24 of the well and the bulkhead 44 extending across the well floor.

Multiple lateral bulkheads may be incorporated into the car. For example, a bulkhead could be located to accommodate a 30 foot long container.

Referring to FIG. 8, the bulkhead 44 is illustrated in an up position. The bulkhead 44 includes a slot opening 56 therein to permit movement of a handle 58 which is attached to the slideable bar 48. The handle on the slideable bar 48 permits the bar 48 to be moved into the bulkhead 44 or retracted therefrom. The bar 48 is moved into the bulkhead 44 when the bulkhead is raised and retracted therefrom when the bulkhead 44 is to be lowered.

The end of the bar 48 includes top protruding member 60 having an opening therein and adapted to receive a locking pin 62 therein. The locking pin is connected through a suitable chain 64 to the latch handle 58, which is disposed to rest on the angle fitting 52 when the bulkhead 44 is in the down position. When the bar 48 is moved into position within the bulkhead 44, the pin 62 is inserted through an opening 66 in the bulkhead to secure the bulkhead 44 through the bar 48.

The bar 48 is also inserted into the side sill 68 of the car through an opening 70. The effect is to provide a continuous bulkhead all the way across the bottom of the car with the two ends of the bulkhead locked into side sills. Thus any loads created in the bulkhead 44 is transferred directly to the side sills of the car. While only one such bar 48 and side sill 68 is illustrated in FIG. 8, it is understood that a similar arrangement will also be provided on the other end of the bulkhead 44. Thus it is seen in FIG. 4 that with the bulkhead 44 in place, the container 32 will be retained between the front wall, the two side walls and the bulkhead 44.

The next situation to be considered is illustrated in FIG. 5 involving a container 44 which is 40 feet long and 8 feet wide. As illustrated in FIG. 5, there is space on both sides of the container 34 as well as space towards the rear of the container 34. Mechanical bulkheads must be provided to restrain the movement of the container 34 during operation. The rear restraint provided by the bulkhead 44 has already been described. Additional mechanical pieces for providing restraint for the lateral or side movements of the container must be provided. Several means of accomplishing this are illustrated in FIGS. 9, 10, 11 and 12.

Referring to FIGS. 9 and 10, the container 34 is illustrated with a corner fitting 72. The corner fitting 72 includes an opening 74 of conventional design adapted to receive the lock therein. A loose rectangular metal piece 76 includes a lock element 78 thereon. The lock element 78 is adapted to pass through the opening 34 of the corner fitting 72. The piece 76 acts as a spacer element and would normally be made of light weight material and keyed to make it easy to handle. The piece 76 is attached to the corner fittings 72 by passing the key or lock element 78 through the opening 74 and then rotating the element 76, 90° to lock it in place onto the corner fitting 72. A similar spacer would be attached to four corners of the container 34 so that the spaces will be between the side walls of the well and the container 32. The spacers 76 would be 3 inches wide to fill in the space between the side walls of the well and the container. Thus, with a bulkhead such as the bulkhead 44 in place toward the rear of a container and spaces being suitably disposed on the two sides of the container 34, the container 34 will be effectively restrained within a well larger than the dimensions of the container.

Figure 11:
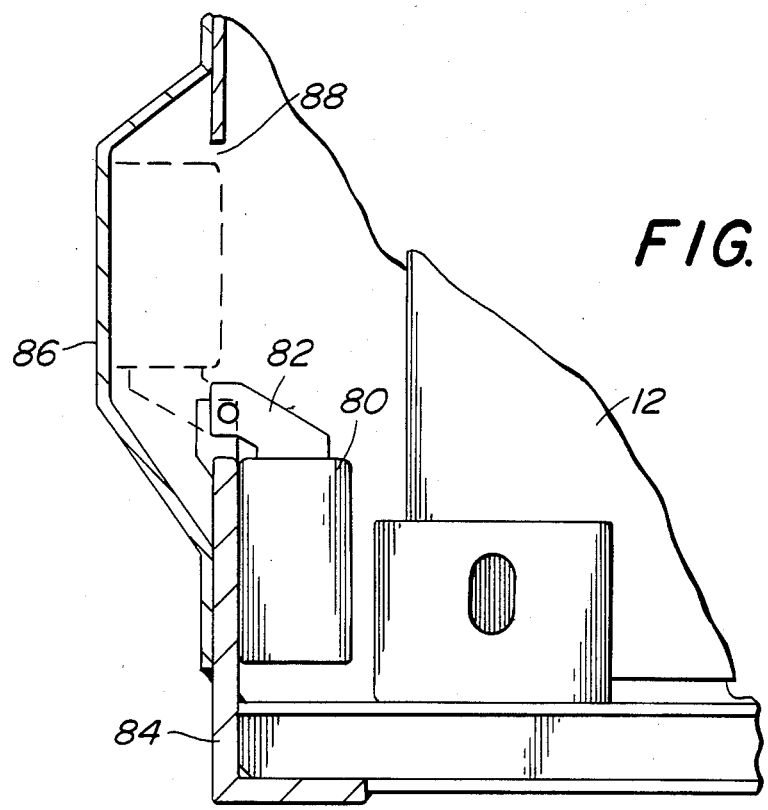
FIG. 11 illustrates another embodiment of the spacer mechanism illustrated in FIGS. 9 and 10.
Figure 12:
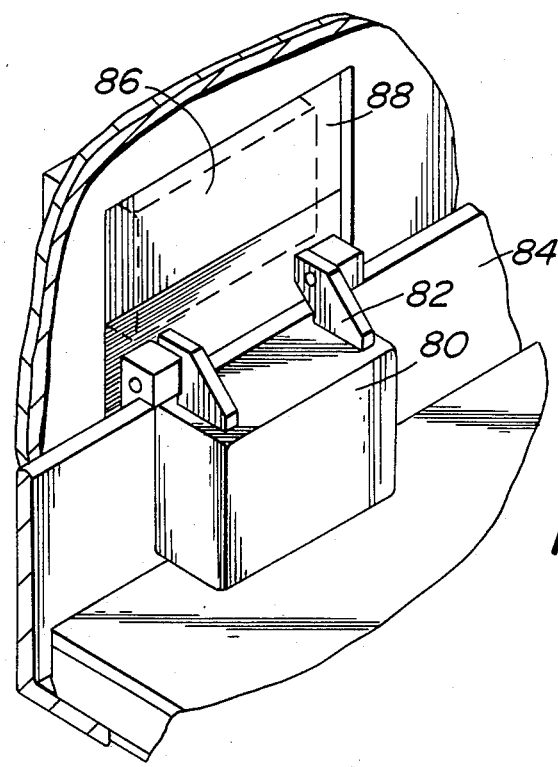
FIG. 12 is an isometric view of the spacer mechanism of FIG. 11 attached to the side wall of the railway car.

Referring to FIGS. 11 and 12, another embodiment for providing spacer elements at the sides of the container is illustrated. In this embodiment, a spacer element 80 provides part of the car structure. A hinge mechanism 82 is connected between the spacer 80 and the side wall 84 of the car. The side wall of the car includes a protruding portion 86 to in effect provide a recessed area for the spacer element 80 when it is in a stored position, as illustrated by the dotted lines. An opening 88 is provided in the wall 84 of the car to permit the spacer element 80 to pass therethrough. The spacer element 80 would be disposed on both sides of the container with it is desired to fill the space between the side walls and the container. It is conceivable that only two larger spacers may be employed. For example, the spacers 80 may be approximately 5 inches wide to fill in the space along the one side of the container. Normally, however, to achieve good balance, four such spacer elements would be employed, two toward the front of the container and two toward the rear of the container. Thus it is seen that the bulkhead arrangement described in connection with FIG. 4 and the spacer element described in connection with FIG. 5 make it possible to restrain movement of the container 34 even through it is shorter and narrower than the standard well of the car.

Referring to FIG. 6, only the spacer elements described in connection with FIGS. 9, 10, 11 and 12 would have to be employed along sides of the container 36 to restrain movement of the container during operation. This is because the length of the container already corresponds to the length of the well in the car.

Thus it is seen, that the present invention may accommodate containers of at least four different sizes, such as illsutrated in FIGS. 3, 4, 5 and 6. The means for accomplishing this objective may be readily incorporated into the structure of the car or trailer involved.

Another feature of the present invention involves the means by which an upper container 10 may be secured to the lower container 12, as illustrated in FIG. 1.

A fitting, such as the angle member 90 illustrated, is adapted to be collected to the four corners of the upper container 10. The angle member 90 may comprise a fabricated piece which uses an 8 inch by 8 inch right angle. The angle member 90 is dimensioned to encompass the corner fitting 92 of the container 10 and the top corner fitting 94 of the container 12. Similar fittings are used at the four corners of the pair of containers. A bayonnet twist type lock assembly 96 is secured to the angle member 90. Such lock assemblies are well known and may be of a type manufactured by Portec, Inc. of Oakbrook, Ill. The twist lock assembly 96 includes a lock member 98 adapted to pass through an opening 100 in the corner fitting 92 of the container 10. The lock element 98 is connected to a turn bar 102 having an opening 104 therein adapted to receive a handle 106. The angle member 90 is secured to the corner fitting 92 by passing the lock element 98 through the opening 100 and then turning the turn bar 102 90° by use of the handle 106 inserted into the opening 104. FIG. 10 illustrates the two containers 12 and 14 locked in place with the corner angle member 90 attached thereto. It is understood that a similar arrangement would be at a ll four corners of the containers.

In normal operation, the lower container 12 is first inserted into the well of the car. The second upper container 10 is then lifted and lowered in place over the first container. The four overlapping corner angle member 90 are in place to maintain the relative positions of the containers 10 and 12 and to restrain any longitudinal or lateral movement therebetween. An angular section 108 extending from the angle member 90 assists in positioning the container 10 over the container 12 as it is lowered in place.

Figure 13:
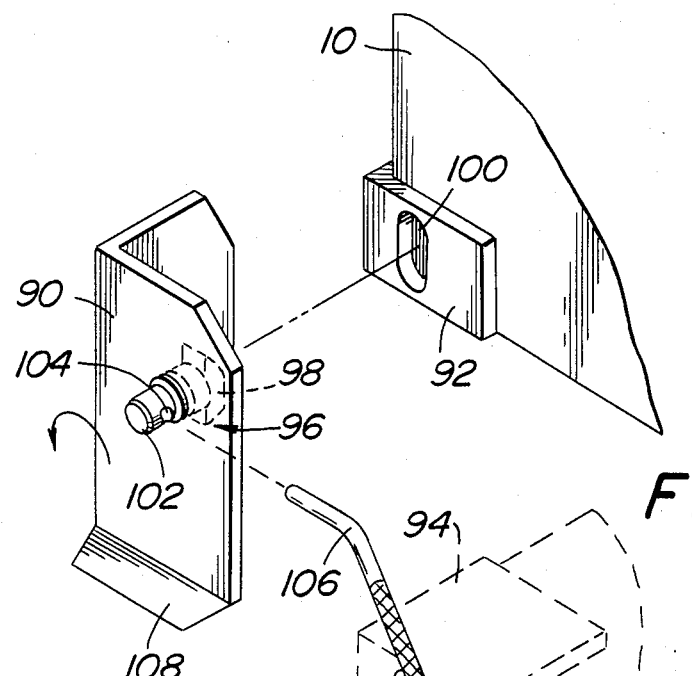
FIG. 13 is an isometric view illustrating the members for attachment of an angle member to a carrier fitting of a container.
Figure 14:
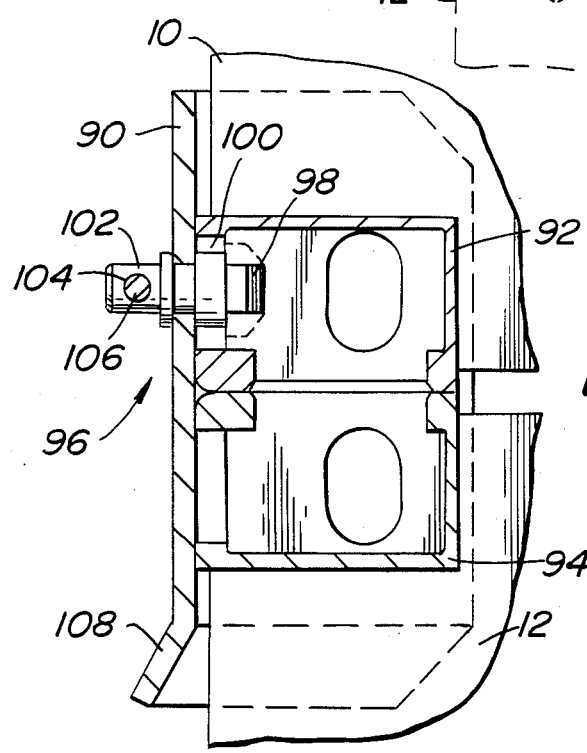
FIG. 14 is a view, partly in cross-section, illustrating the angle member of FIG. 13 locked to the corner fitting of the container.

While the locking mechanism on the fitting 90 is illustrated as being attached to the upper container, the angle member 90 may actually be connected to the top corner fitting of the bottom container 12. In effect, in FIG. 13, the lower corner fittings are extended below the upper corners of the bottom container so that any relative motion between the containers causes the loads created to be transferred from the angle member fittings directly into the corner fittings of the opposite container. In this way, all the longitudinal and lateral forces are carried through this fitting. As far as any vertical loads are concerned, gravity is relied upon to keep the two containers together. The lengths of the angle member fittings are such that relatively high relative motions between the containers would be required before the containers would separate. This is an unlikely situation.

After the transporting of the containers, the fittings may be taken off the containers and suitably stored for use in the next operation.

The locking of two adjacent corner fittings together in effect produces two containers acting as one.

The present invention preferably utilizes a flat car which has a relatively low level floor or base. In addition, the cars contemplated are relatively short and not the conventional 90 foot long or longer freight cars. This facilitates the turning the cars when the train is of relatively long length. The stacking of the containers make it possible to provide the train of relatively short length.

A low level car is desired because a standard flat car would be too high to stack containers. The reason for this is that the center of gravity would be too high and the car would tend to be subjected to excessive roll motions which conceivably could lead to derailment. Using a low level car permits the lower container to be located down in the well with the loaded car being within the conventional limits from the standpoint of center of gravity height and from the standpoint of overall height.

The present invention has therefore provided an arrangement which permits the transporting of a relatively large number of cars of various sizes. The stacking of the cars have been achieved in a relatively simple manner which eliminates the use of relatively heavy bulkheads the like for supporting the upper containers.

The well of the container may be designed to carry trailers, in which case, it must have a different floor structure to accommodate wheels, hitch mechanisms and other changes not directly related to the invention.

What is claimed is:

1. A combination for stacking containers of the same size in a flat carrier of a predetermined size with the containers including corner fittings for receiving locking devices therein;
   (a) a plurality of angle members dimensioned to overlap the corner fittings of an upper and lower container when two containers are stacked;
   (b) each of said angle members include angular portions extending from one end thereof to facilitate the placing of one container over another when said angle members are in place;
   (c) said carrier comprising an elongated well therein formed by a floor surrounded by front, rear and a pair of side walls to receive said lower container therein and to restrict the movement of said lower container when the size of said bottom container is of substantially the same dimensions as said lower container;
   (d) a locking device connected to each of said angle members to lockingly engage one of said upper or lower containers whereby when said plurality of angle members are locked in place, they will maintain the relative positions of said upper and lower container with respect to each other,
   (e) said locking device including a lock member disposed to be inserted into the opening of a corner fitting of one of said containers and a turn bar adapted to be manually turned through a right angle to lock said lock member to said one container;
   (f) means in said carrier to provide a movable bulkhead normally stored in the floor of said flat carrier and adapted to be moved into a position to limit the movement of said containers when said container is dimensioned shorter than said floor; and
   (g) a connecting bar slidably mounted within said movable bulkhead at both ends thereof and adapted to be moved into side sill members forming parts of said side walls to provide longitudinal restraining means laterally across the floor of said flat carrier.

2. A combintion as set forth in claim 1 wherein said movable bulkhead is hinged to said floor and includes a locking device to lock said movable bulkhead to said connecting bar when said movable bulkhead is in a vertical position.

3. A combination as set forth in claim 2 wherein spaced means are provided in said carrier between one of said side walls of said container to limit the movement of said container when said container is dimensioned narrower than said front and rear walls of said carrier.

4. A combination as set forth in claim 3 wherein said spacer means comprises a metal fitting having a locking device thereon adapted ot be inserted into the opening of the bottom corner fitting on said lower container and rotated 90 degrees to lock said metal fitting thereto and fill in the space between said side wall and said power container to laterally restrain said lower container within the well of said flat carrier.

5. A combination as set forth in claim 4 wherein said spacer means are disposed on both sides of said lower container.

6. A combination as set forth in claim 3 wherein said spacer means comprises a hinged member attached to one of the side walls of said flat carrier.

7. A combination as set forth in claim 6 wherein said one side wall includes a recessed area thereto to permit said spacer means to be selectively moved from one position to another to store said spacer means in said recessed area and to a second position to laterally restrain said lower container within said well.

8. A combination as set forth in claim 3 wherein said flat carrier comprises a railway car having a relatively low floor level in said well.

* * * * *